United States Patent [19]

Bolduc

[11] Patent Number: 5,086,870

[45] Date of Patent: Feb. 11, 1992

[54] JOYSTICK-OPERATED DRIVING SYSTEM

[75] Inventor: Scott Bolduc, Dunkirk, Md.

[73] Assignee: Division Driving Systems, Inc., Capitol Heights, Md.

[21] Appl. No.: 606,560

[22] Filed: Oct. 31, 1990

[51] Int. Cl.$^5$ ............................................. B60K 26/00
[52] U.S. Cl. ..:................................ 180/333; 180/336
[58] Field of Search ............... 180/315, 320, 333, 335, 180/336

[56] References Cited

U.S. PATENT DOCUMENTS

| | | | |
|---|---|---|---|
| 3,814,199 | 6/1974 | Jones | 180/333 |
| 4,476,954 | 10/1984 | Johnson et al. | 180/333 |
| 4,645,030 | 2/1987 | von Bernuth et al. | 180/333 |
| 4,699,239 | 10/1987 | Ishino et al. | 180/315 |
| 4,702,520 | 10/1987 | Whisler et al. | 180/333 |
| 4,722,416 | 2/1988 | Ahnafield | 180/333 |
| 4,817,471 | 4/1989 | Tury | 74/866 |

OTHER PUBLICATIONS

Human Factors Analysis of Automotive Adaptive Equipment for Disabled Drivers, Koppa et al., Dept. of Transportation Report No. DOT HS-805-726, Oct. 31, 1980.

Primary Examiner—Kenneth R. Rice
Attorney, Agent, or Firm—Thomas L. Bohan

[57] ABSTRACT

A remotely controlled system for the operation of a vehicle wherein a limited physical input is translated into desired vehicle movement. The invention uses a unitary manipulator with two axes of movement to direct the steering, acceleration and braking functions of the vehicle. The surplus current available from the main battery of the vehicle powers the control system. The steering function of the invention involves the conversion of a mechanical input into a frequency-based signal which is processed by a primary steering microprocessor. This microprocessor in turn directs a frequency-based motor controller to operate a motor which rotates a steering shaft of the vehicle. The acceleration and braking functions operate in the same way, wherein a primary acceleration microprocessor acts upon a frequency-based signal to direct a frequency-based motor which is connected to the accelerator and brake pedals of the vehicle. In order to provide a smooth transition from the manipulator input to motor operation, the motors of the present invention are preferably stepper motors. The invention can be disengaged to permit standard operation of the steering wheel and accelerator and brake pedals of the vehicle.

23 Claims, 11 Drawing Sheets

A DEADBAND FROM CENTER
B OUTSIDE MOTION BAND
C HOLDING DEADBAND
D CENTERING MOTION BAND

JOYSTICK-OPERATED DRIVING SYSTEM

BACKGROUND OF THE INVENTION

1. Field of the Invention

This invention relates to the field of systems for the operation of motor vehicles with specialized control systems. More particularly, this invention relates to systems whereby the steering, acceleration and braking functions of a conventional motor vehicle are controlled by a single device through the mediation of microprocessors.

2. Description of the Prior Art

The mobility of the individual is considered an essential element in the educational, business and recreational aspects of life in our society. In particular, this mobility permits the individual to be self-sufficient and, therefore, less reliant upon society for his or her well-being. The principal basis for the realization of this individual mobility, which has essentially occurred within the last fifty years, has been the proliferation of motor vehicles. Currently it is estimated that there are more than 120 million individually-owned vehicles in this country alone. Typically, these vehicles are produced, en mass, and sold to individuals who use them to travel from home to school, or to work, or to any other location of choice.

For most individuals this mobility is achieved simply by stepping into their production-line automobiles, turning on the engine and driving away. Unfortunately, within our society there are several hundred thousand Americans who are paraplegic or quadriplegic (i.e., suffer from restricted motion and strength in one or more limbs of the body) and who therefore cannot simply step into their autombiles and drive away. For these individuals the production-line automobile does not provide the mobility most take for granted. Since one of our societal goals, as evidenced by recent legislation—see the AMERICANS WITH DISABILITIES ACT OF 1990, enacted July 26, 1990—is to provide all physically-impaired individuals with equal access to all those activities which are available to the population as a whole, there is great pressure to provide equivalent mobility. To this end, several devices have been developed in order to transform production-line vehicles into accessible and useable vehicles for the physically-impaired. Nevertheless, the prior art devices directed to this end suffer from various deficiencies which make them unsuitable. Generally, these devices have problems related to the electronics and to the user/vehicle interfaces which either render the vehicles inoperable, or at least very difficult to operate by the seriously impaired individual. Confronted with such problems, the handicapped individual may minimize his or her use of the vehicle and this, in turn, undercuts the goal of selfsufficiency.

One particular prior art means for control of a vehicle by a physically-impaired individual is the control device of Ahnafield (U.S. Pat. No. 4,722,416). Ahnafield discloses the use of hydraulic cylinders for operating the steering, acceleration and braking of a vehicle. Control of all of the hydraulic cylinders is achieved through the operation of a remote manipulator and the hydraulic pressure used in the cylinders is delivered by the vehicle's own hydraulic pump. The remote manipulator described by Ahnafield comprises a single joystick of the type well known in the field of motorized wheelchairs. Such manipulators provide two axes of motion wherein side-to-side motion is translated into left and right turns, and forward and backward motion are translated into acceleration and braking.

Another type of control device is the one disclosed by Johnson et al. (U.S. Pat. No. 4,476,954). This device also operates by means of a single joystick, similar to the one described by Ahnafield. The joystick controls input to DC motors which are then used to rotate the steering wheel and to depress the accelerator and brake pedals. In particular, the joystick has a range of motion that approximates the range of motion of an airplane joystick. Although the use of such a joystick for controlling a vehicle is of particular interest to the physically-impaired individual, such a range of motion may limit the usage of the Johnson device to those individuals with the dexterity to reach and maintain full extension as the driving situation dictates.

The prior art devices which provide a joystick method of operating a vehicle all fail in one particular aspect: they do not fully address the needs of the physically-impaired individual. Although such individuals have physical deficiencies, they respond to driving stimuli utilizing the same mental processes as fully functional individuals. In order to provide vehicle access to all but the most severely impaired, there must be a control system which translates the limited movement and strength of the individual into commands that direct the vehicle to operate as a function of the mental process rather than the physical process. To do so, the translation from electronic input, initiated by the physically-impaired individual, to operation of the vehicle must be as smooth as the translation from the brain to the hands and feet of the normal individual.

Additionally, to make the vehicle completely adapted for physically-impaired use, there must be means by which the impaired individual may control the vehicle in the event of catastrophic failure of the control system. In the prior art devices, failure of one or more major components disables the control system and prevents the physically-impaired individual from controlling the vehicle entirely. Such catastrophic failures are often caused by environmental exposure of system components placed external to the passenger compartment of the vehicle. It is therefore essential that any backup system be placed within the passenger compartment of the vehicle. Also, any backup system which permits continuous operation by the impaired individual after catastrophic failure of a primary component must continue to account for the similarities in mental processing as described above.

A further problem associated with the prior art devices is the difficulty in switching control of the vehicle from a unitary mode of control to a conventional able-bodied mode of control. These devices often require hours of servicing by an expert mechanic to remove all the disabled-body features and reset the standard steering and acceleration/braking functions.

Therefore, what is needed is a control device for the operation of a vehicle by a physically-impaired individual that: (1) provides a means by which the normal thought processes used in steering, accelerating and braking a vehicle can be implemented smoothly regardless of the physical impairment of the operator; (2) provides multiple redundant backup systems to guard against catastrophic failure of the system; (3) accommodates the full range of impairments associated with the particular individual; (4) is contained within the passenger compartment of the vehicle; and (5) can be easily switched, in a short period of time, from disabled-body control to conventional able-body control.

SUMMARY OF THE INVENTION

The devices which have been described as providing control of a vehicle through a unitary control joystick are useful starting points for the physically-impaired individual. Such devices have been known and used for a long time in specialized land vehicles (see, for example, the lunar rovers utilized during the exploration of the moon in the 1970's and in other experimental vehicles as early as the 1950's). Although the single joystick means of control is an essential element in the operation of a vehicle by a physically-impaired individual, it is necessary to accommodate the physical-impairment throughout the entire control system. In particular, it is necessary to provide a response to joystick operation which accounts for, in all essential features, the steering, acceleration and braking patterns which are most natural for the human brain. This is achieved in the present invention through the use of a joystick with a small range of motion, a joystick-interfacing design which permits "digitized" steering, acceleration and braking control, backup control systems and mechanical components that provide a smooth transition from a limited physical input to a desired vehicle movement.

STEERING ASPECTS

In the present invention, the first consideration in providing accommodation throughout the control system is the human interface with the steering operation of the vehicle. Observations of able-body driving techniques, undertaken during the development of this system, demonstrated a decidedly repeatable driving pattern and illustrated a key principle: steering of a vehicle is basically a *digital* action. When approaching and negotiating a turn, drivers first assess the amount of steering input required to accomplish the maneuver. They then rotate the steering wheel to a particular position and hold it for a duration which they believe will accomplish the desired maneuver. Once under way they constantly reassess the initial decision and make required adjustments to the steering wheel angle. Once at the desired turning radius they continue to assess the situation and make small incremental adjustments. This also occurs coming out of the turn. It is a process which follows the logic of assess, act, reassess, react and complete. There is, of course, a difference between entering and exiting a turn with a vehicle in that in coming out of a turn the input is not powered by the driver; instead, the driver permits the natural recentering of the steering wheel to accomplish the desired adjustement. In effect, the vehicle itself limits the required driver input. All human beings appear to process the perceived driving situation in the same way; however, the physically-impaired individual is physically incapable of acting on his or her perception in the same way as the physically-able individual can. It is precisely the elimination of the physical impairment bottleneck which is at the heart of the present invention.

A problem of particular concern addressed in the present invention involves the relationship between the limited range of motion of the physically-handicapped individual and the extent to which a steering wheel can be rotated. The means of control of steering was to consist of a remote manipulator directed by the driver's extremity, with the arm being supported so as to bring the extremity into comfortable proximity to the manipulator. This was only the beginning of the solution to the problem. In particular, a manipulator which controls the entire turning radius of a steering wheel (typically, a total of four steering wheel revolutions from left lock to right lock) in a direct manner would have been extremely sensitive to any driver motion. Contrary to all prior art, the present invention provides a digital rather than analog link between the driver input and steering angle. This is done by means of a "split-stick" joystick wherein the sensitivity of the joystick input to the steering wheel varies with the steering angle and rate of speed of the vehicle. This digital rather than analog input means is achievable through the present invention utilizing a programmed central processing unit and stepper motors to translate a small range of joystick motion into full scale steering wheel motion.

Even more important is the present invention's "turn and hold" feature which enables the physically-impaired driver to operate a vehicle in fundamentally the same manner as the able-bodied driver. Contrary to prior art steering controllers, the present invention permits the driver to turn the wheels of the vehicle to a particular angle and hold them at that position. In this way the joystick can be set to one position and held without the requirement that it be continuously adjusted back and forth in response to the wish to maintain a constant steer angle on the vehicle's front wheels.

OTHER ASPECTS

A central problem which had to be addressed involved the effect of a catastrophic failure on any major component of the system and how that would affect the ability of the physically-impaired individual to maintain control of the vehicle with his or her limited range of motion. This is achieved in the present invention by providing redundant backups to all critical components. In particular, the central processing unit of the invention contains complete dual control components which are independently powered such that a failed element, such as a microprocessor, is automatically backed up. In addition, the cables in closed loop operations of the system are backed up with secondary cables. Finally, unlike prior art devices, the present invention automatically shuts down the vehicle in the event of a mechanical component failure, but nevertheless, with enough backup power to permit the physically-impaired individual to bring the vehicle to a complete stop on the side of the road.

The central processing unit of the present invention comprises four microprocessors that control the active input and output of the system and which are set up independently and operate autonomously. Two of these microprocessors are active in the primary mode and the other two microprocessors are redundant backups to the first two. One of the primary microprocessors controls the input and output associated with the steering functions of the vehicle, and the other primary microprocessor controls the acceleration and braking functions. Although the two secondary microprocessors will control the respective mechanical functions of the vehicle only when the primary microprocessors fail, the backups are operational at all times, serving as reference checks for the primary controllers. Contained within each of the four microprocessors is a coordinating integrated circuit which enables an exchange of information between the microprocessors such that they perform as autonomous devices without attempting to control the entire system. The coordinating circuitry is of the type which is standard within the automotive industry.

The input signal received from the remote manipulator of the present invention is analyzed by the microprocessors, which in turn provide an output signal to stepper drive controllers corresponding to the stepper motors. The stepper drive controllers in turn convert these signals into motion information for the stepper motors of the system. As with the microprocessors, there is a mirrored pair of stepper drive controllers and associated switch-over circuitry to allow for backup operation. The stepper drive controllers control the direction of motion and speed of the stepper motors by translating low level control signals from the microprocessors into the required voltage and current to obtain the power needed at the stepper motors to achieve the desired motor rates and directions. The direction of stepper motor motion is relayed by the motor drive controllers by virtue of the order in which the windings of the motors are energized, and the rate of stepper motor motion is controlled through the frequency in which the windings are activated, all as is well known. The utilization of a combination of microprocessors, stepper drive controllers and stepper motors thereby permits translation of a small joystick range of motion into thousands of discrete and repeatable locations of steering wheel and accelerator/brake positions.

As part of the entire control system of the present system which enables the physically-impaired individual to operate a vehicle, there is also incorporated a programmable control pad. This pad permits the driver with limited dexterity to control all of the other necessary functions of the vehicle, including: engine start-up; automatic shifting; window, lock and light control and several other functions. The pad is positioned for easy access, has a wide target area, and is color-coded for quick recognition. It is programmable in the sense that each specific pad area can be programmed to operate any of the vehicle's switch controls. This includes the capacity to make the specific pad area outputs correspond to either a latch-type or a hold-type switch function.

Although the present invention is described as operable essentially by physically impaired individuals, it is to be understood that the control system disclosed herein is a complete system that is operable by able-bodied individuals as well and therefore should not be seen as being limited to any one use in particular.

DETAILED DESCRIPTION OF THE PREFERRED EMBODIMENT

Figure 1:
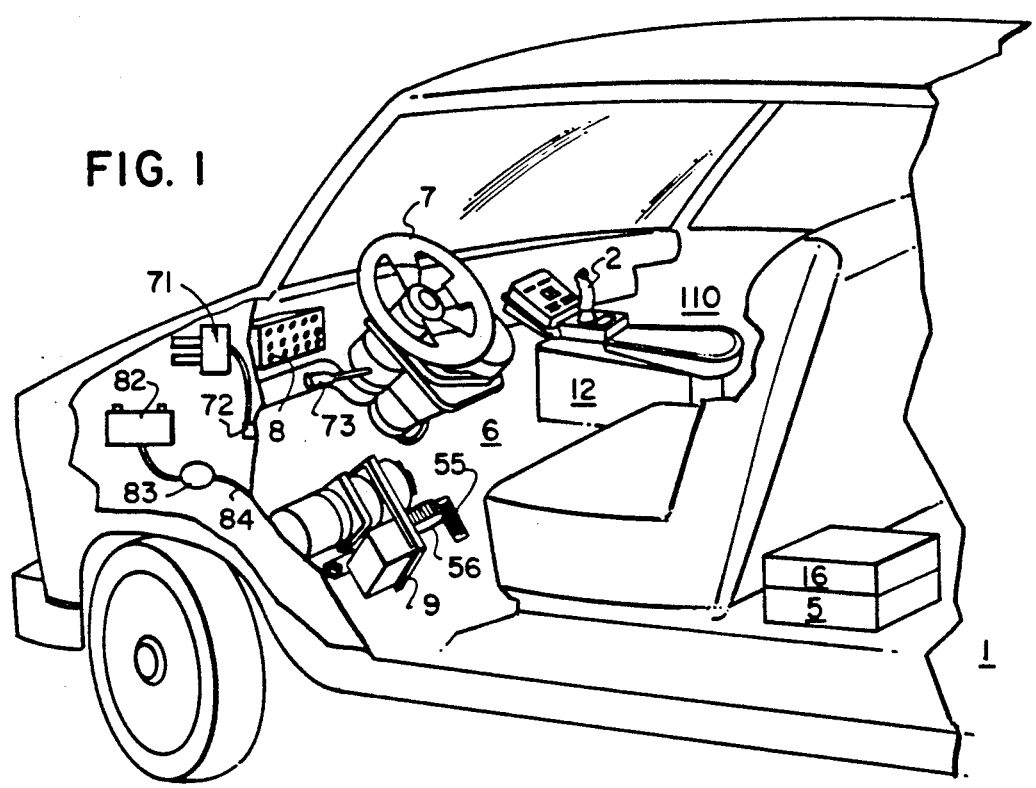
FIG. 1 is a perspective view of the components of the present invention located within a vehicle.

As illustrated in FIG. 1, a joystick-operated control device is affixed to a vehicle 1 in accordance with the present invention. The vehicle 1 is of any type having an automatic transmission, steering means, acceleration means and braking means. To accommodate the physical limitations of a physically-impaired individual, the operation of said vehicle 1 must be achievable through minimal physical movement. Therefore, in accordance with the present invention, said vehicle 1 is completely operable through the manipulation of a single joystick 2 and a control touch pad 8. In particular, movement of said joystick 2 to the left or right translates into a left or right turn of said vehicle 1 and forward and backward motion of said joystick 2 accelerates and decelerates said vehicle 1. The motion of said joystick 2 transmits a signal to a central processing unit 16, which in turn directs a power supply/drive unit 5 to command a steering assembly 6 to operate a steering wheel 7, and an acceleration/braking assembly 9 to operate an acceleration pedal 55 and a braking pedal 56 of said vehicle 1.

To power the present invention, the operating system of said vehicle 1 can be used. This 12-volt supply consists of a main battery 82 and an alternator 83 and is connected to said power supply/drive unit 5 through a power cable 84. While the vehicle power supply is in normal operation, it is capable of delivering a minimum of between 200 and 500 amps instantaneously and between 70 and 100 amps continuously. In normal operation there exists a surplus of approximately 55 amps which can be drawn for use by the present invention without any detrimental effect on the rest of the vehicle's system. The preferred embodiment of the present invention has been designed so as require no more than 45 amps at all times.

Figure 2:
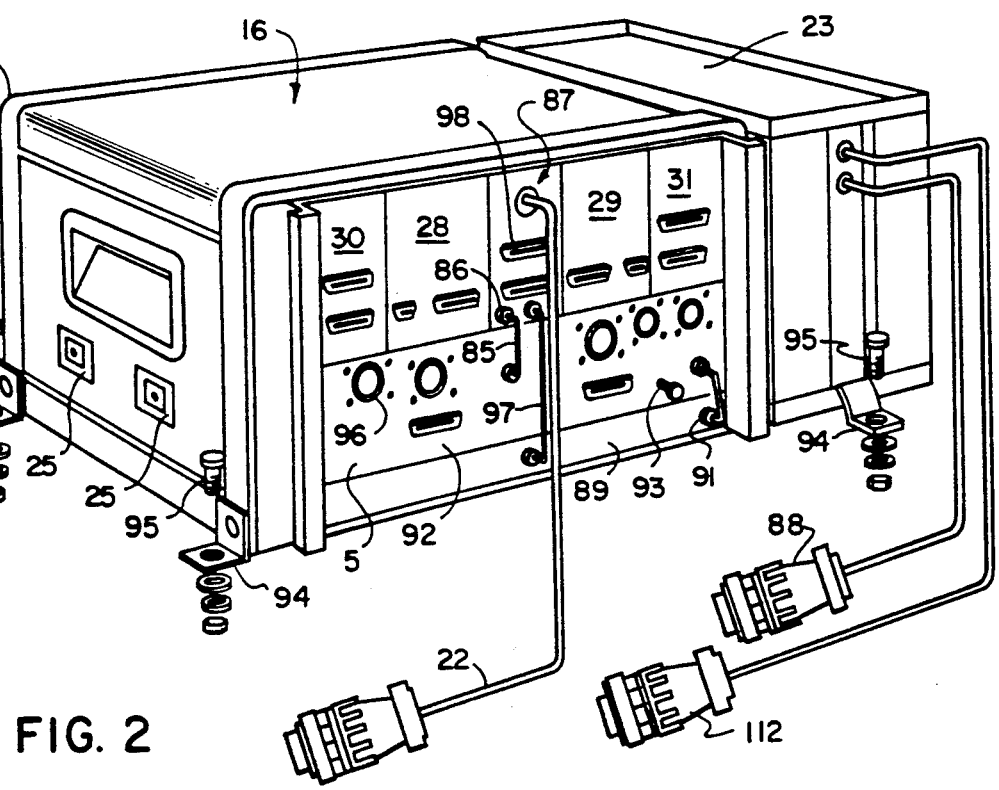
FIG. 2 is a perspective view of the central processing unit, power supply/drive unit and backup power supply of the present invention.
Figure 3:
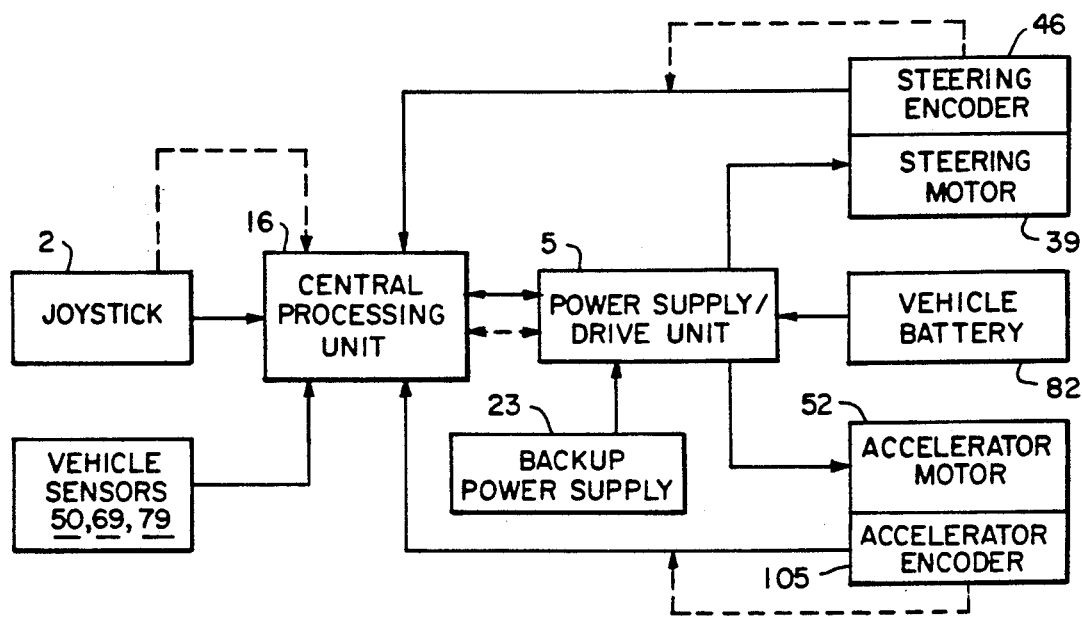
FIG. 3 is a schematic diagram of the central processing unit and the power supply/drive unit of the present invention.

As illustrated in FIGS. 2 and 3, said power supply/drive unit 5 powers said central processing unit 16 through a controller power cable 85. Said controller power cable 85 comprises a 25 pin d-subminiature connector 86 that is screwed into a power receiver 87 of said central processing unit 16. To provide a redundant source of power to said central processing unit 16, a backup power supply 23 is connected to said central processing unit 16 using a circular format locking plug 88. Within said power supply/drive unit 5, a voltage converter 89 steps the 12-volt input from said main battery 82 up to 84 volts. This higher voltage is required to operate stepper motors and their corresponding drives in order to achieve the high motor speed and high torque necessary to accommodate the physical impairment of the driver. Output from said converter 89 is also used to power said central processing unit 16, after the supplied power has been filtered and reduced to 60 volts.

Said converter 89 is a subunit mounted to the bottom of an enclosure 90 of said power supply/drive unit 5 and is connected to said power supply/drive unit 5 by means of a circuit latching plug 91. Said circuit latching plug supplies said converter 89 with vehicle voltage and ground and supplies the system with a positive 84-volt output and a ground. Vehicle ground for said unit 5 is supplied through a front panel 92 of said enclosure 90 by way of a threaded stud 93 and utilizing a braided ground strap 94 to a ground bolt 95 through the floor of said vehicle 1. Input voltage to said unit 5 is controlled through a power relay 96 located on a coordinating microprocessor activated by said central processing unit 16. Said converter 89 has the capability to limit its output current and then reset to normal when demand is reduced. A status line 97 provides communication from said central processing unit 16 indicating when output is to be reduced.

In the event of main power failure, said backup power supply 23 is a 78-volt battery with the capacity to provide power to the entire system of the present invention for up to 45 minutes. Further, a switching circuit 98 within said central processing unit distributes power from said converter 89 to said backup power supply 23 in order to provide a constant float charge to said backup power supply 23.

Figure 4:
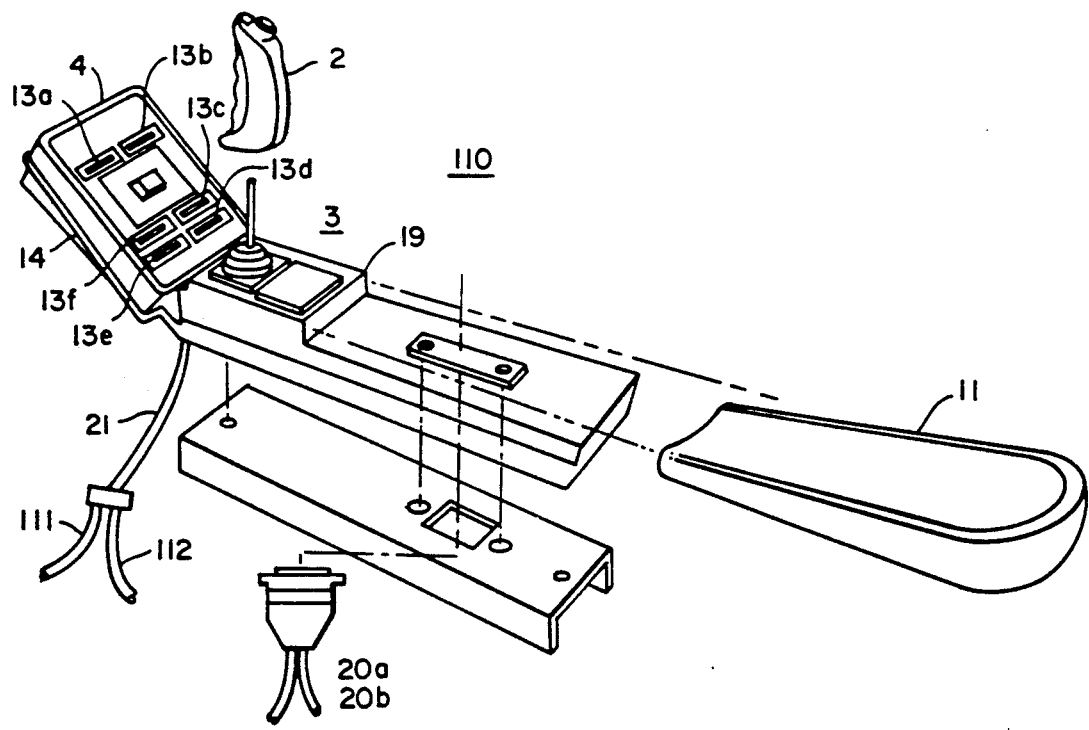
FIG. 4 is an expanded view of the armrest unit of the present invention.

As illustrated in FIG. 4, the manipulative means for controlling the steering, acceleration, and braking operations of said vehicle 1 is contained within an armrest unit 110. Said armrest unit 110 comprises a system display unit 4 and a control arm assembly 3. In particular, said display unit 4 informs the vehicle operator of the operational status of the system at any given time. Said display unit 4 comprises six lighted indicators 13a-f and a manual backup switch 15, all of which are located forward of said joystick 2 so as to permit easy viewing. Said indicators 13a-f and said backup switch 15 are contained in an acrylonitrile-butadiene-styrene (ABS) housing 14. Two of said indicators 13a and 13b disclose whether the present invention is in "OPERATION" or in a "BACKUP" mode. BACKUP is illuminated when said manual backup switch 15 is activated since this changes the system from primary to backup control if automatic means of switching primary to secondary functions fail. The remainder of said indicators, 13c-f, serve to announce, respectively, that the system is: (1) in "STANDBY"—a phase of operation characterized by a central processing unit 16 being in its self-diagnosis and initialization mode; (2) in "BATTERY" when said backup power supply 23 is at low voltage; (3) in "TEMP" when detectors of the present invention detect operating temperatures outside of the safe-operating range; and (4) in "SERVICE" when said central processing unit 16 has detected a system default.

Said control arm assembly 3 contains said joystick 2, electronic equipment 18 located within a junction box 19, and an orthotic pad 11. Said control arm assembly 3 is affixed to a base 12 in said vehicle 1, wherein said base 12 is modifiable to accommodate the particular user. The interface between said electronic equipment 18 and said central processing unit 16 comprises a primary interface cable 20a and a secondary interface cable 20b. Said primary cable 20a supplies power to said electronic equipment 18 within said junction box 19, transmits command signals from said central processing unit 16 to said display unit 4 and transmits input signals from said joystick 2 and said manual switch 15 to said central processing unit 16. Said secondary cable 20b is a redundant backup link and carries electronic signals from parallel circuitry within said junction box 19 in the event of primary system failure. Said parallel circuitry is also utilized by said central processing unit 16 to confirm primary circuit reliability. An indicator light power source connector 21 is also housed within said control arm assembly 3. Said connector 21 connects a vehicle battery power wire 111 and a backup power supply wire 112 to said indicator lights 13. All wiring in said interface cables 20a and 20b which interfaces with said central processing unit 16 is internally harnessed, uses latching-type headers, is strain relieved and is protected from chaffing, all as part of addressing the crucial need for reliability and multiple redundancy.

The interface between said joystick 2 and the mechanical elements of said vehicle 1, i.e., the acceleration, braking and steering mechanisms, is controlled through said central processing unit 16. Said central processing unit 16 contains the circuitry to initiate use of the system as well as the microprocessors that control the electronic/mechanical interfacing of the driver inputs and vehicle operation, all of which sub-systems are well known within the industry. Four levels of electronics are all contained within said central processing unit 16. These four levels correspond to: (1) initialization of the joystick-control of the vehicle and sensing vehicle status: (2) control of vehicle motion; (3) perform input and output functions; and (4) perform self-checks to evaluate control reliability. Within each of two primary microprocessors, 28 and 29 and each of two secondary microprocessors 30 and 31 of said central processing unit 16 there is a coordinating integrated circuit. In the preferred embodiment, said coordinating integrated circuit is the CAN chip, manufactured by Intel. Said CAN chip permits the transfer of knowledge and data back and forth between said microprocessors 28-31, wherein the coordination of said microprocessors 28-31 is prompted by programming commands, all as is well known. Through this command system mechanical functions of the present invention can be varied to meet the needs of the particular vehicle operator.

To begin operation of the preferred embodiment of the present invention, an initialization sequence incorporated into the programming of said central processing unit 16, performs a systemwide evaluation prior to engaging joystick control of the vehicle. Said sequence checks all system utilities and hardware individually. All vehicle evaluation information is transmitted through said vehicle 1 by means of a vehicle interface cable 22, which interfaces with several vehicle sensors, all of which are well known. Although redundant elements are essential features of the present invention, there is no redundancy for said vehicle interface cable 22, primarily because of the sturdy design of the components involved, and because failure of said vehicle interface cable 22 is non-catastrophic to the present invention.

Figure 5:
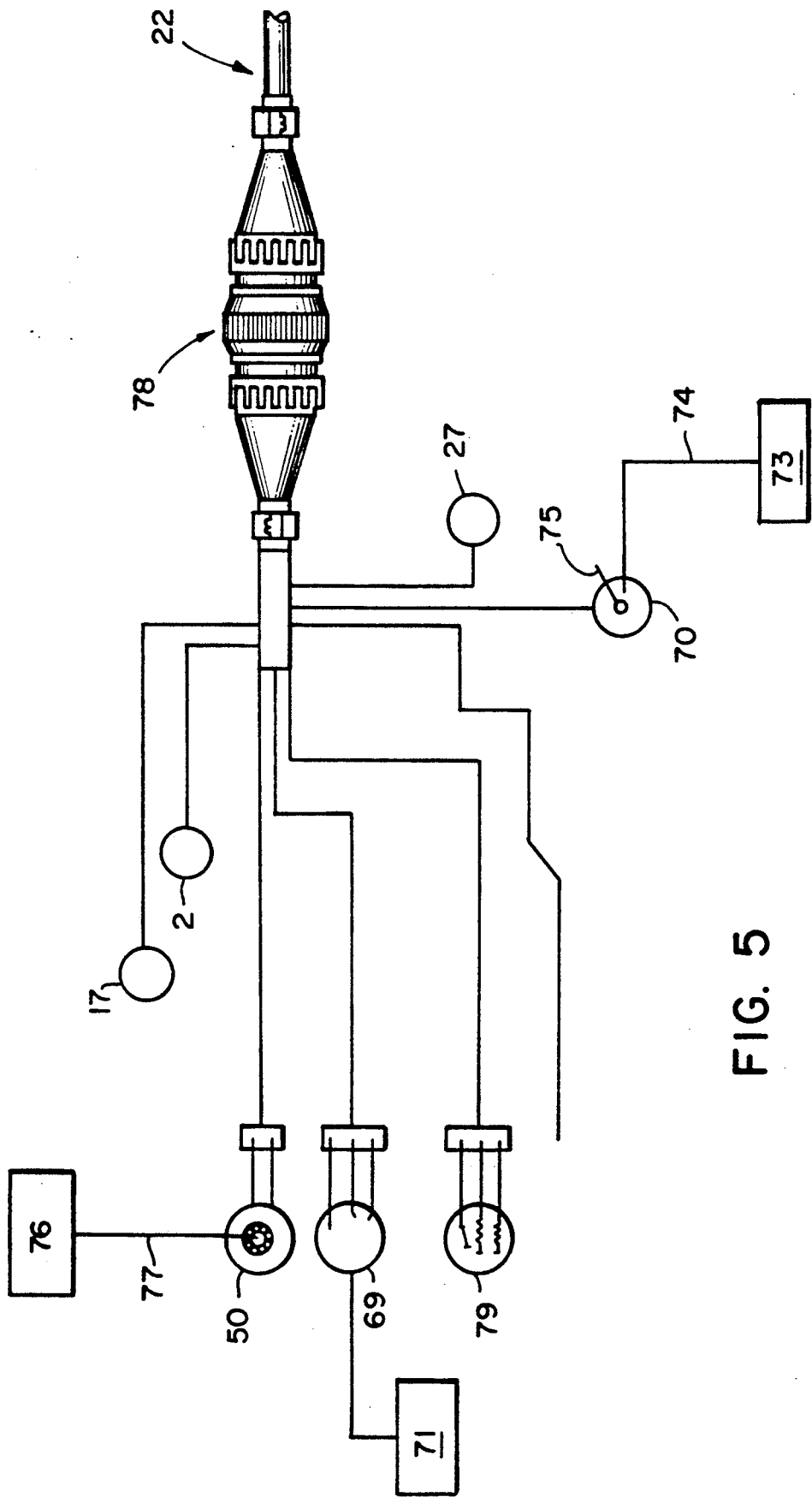
FIG. 5 is a schematic diagram of the vehicle sensing system and ignition interrupt system of the present invention.

As illustrated in FIG. 5, the information transmitted through said vehicle interface cable 22 is derived from a vacuum sensor 69, a park sensor 70 and a speed sensor 50, which transmit current vehicle status information utilized by said central processing unit 16 to evaluate vehicle readiness. Said vacuum sensor 69 connects to a manifold system 71 of said vehicle 1 by means of a tee tap 72. Said vacuum sensor 69 is set to trigger when the engine of said vehicle 1 stops producing a vacuum. Said park sensor 70 is placed on a power shifter apparatus 73 of said vehicle 1 and is set to trigger when said shifter apparatus 73 is set to PARK. Said park sensor 70 is constructed of a high quality microswitch and is mounted such that a mechanical linkage 74 of said shifter apparatus 73 trips a switch lever 75 of said park sensor 70 when said shifter apparatus 73 is placed in PARK. Said speed sensor 50 connects directly between a speedometer 76 and a speedometer cable 77 of said vehicle 1. Said speed sensor 50 sends an electrical signal to said central processing unit 16 identifying vehicle motion and speed.

Figure 6:
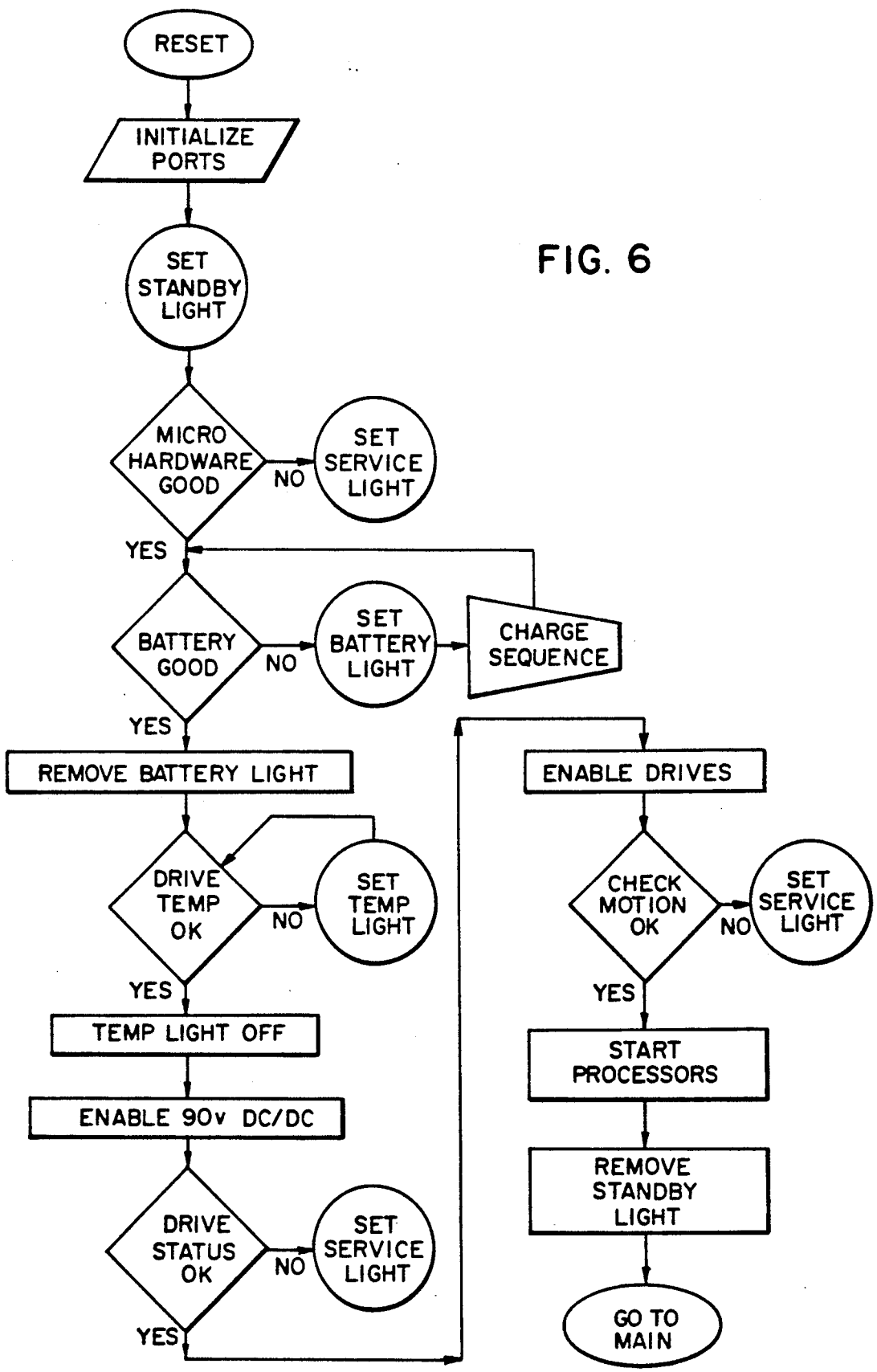
FIG. 6 is a flow diagram of the initialization sequence of the present invention.

When said procesing utit 16 senses that said vehicle 1 is: (a) in park, (b) not moving, (c) has engine vacuum and (d) ignition is on, said STANDBY indicator 13c is lighted to inform a driver that the system self-check has been initiated, as illustrated in FIG. 6. During this sequence, said microprocessors 28-31 prevent said vehicle 1 from being shifted out of PARK until OPERATION indicator 13a is lighted. Next, a diagnostic check is made of said four microprocessors 28-31 of the invention. If a failure is detected then the initialization sequence stops and said SERVICE indicator 13d is lighted.

If there are no failures detected in the microprocessors, then said backup power supply 23 is checked for full charge. If not fully charged, said BATTERY indicator 13e is lighted and said processing unit 16 initiates a charging sequence utilizing said main battery 82. After said backup power supply 23 status has been confirmed, the temperature at said enclosure 90 is measured. If said drive temperature is outside of the temperature range of 32° F. to 140° F. (0° C. to 60° C.), then said TEMPERATURE indicator 13f is lighted. In order to bring said drive temperature within the stated range, ventilation fans 25 are activated and said drive temperature is remeasured every 0.05 seconds. When said drive temperature is brought within the stated range, said TEMPERATURE indicator 13f is turned off by command of said central processing unit 16. Next in the initialization sequence is the evaluation of steering and acceleration drive controllers 26a and 26b respectively. Said drive controllers 26a and 26b power steering and acceleration motors 39 and 52 respectively. Said SERVICE indicator 13d is lighted if there is a fault in either drive controller 26a or 26b. If no fault is detected, then said central processing unit 16 enables said drive controllers 26a and 26b to power said motors 39 and 52, which are in turn operated and evaulated by said central processing unit 16 for movement and feedback. If fault is found during this procedure said SERVICE indicator 13d is again lighted and the initialization sequence is halted. When all evaluations indicate proper operation and feedback of these critical systems, then primary microprocessors 28 and 29, and secondary microprocessors 30 and 31 are activated and said STANDBY indicator 13c is turned off and said OPERATION indicator 13a is lighted.

To prevent start-up of the initialization sequence, an able-body switch 79, connected to said vehicle interface cable 22, disables said vacuum sensor 69 and sends voltage to an ignition circuit 27 to permit normal operation of said vehicle 1. In this manner, said central processing unit 16 never senses the proper inputs from the various sensors and therefore never begins the initialization sequence.

While the system comprising the present invention is in operation, said primary microprocessors 28 and 29 constantly check themselves against said secondary microprocessors 30 and 31. Through said CAN circuit, all information gathered by the microprocessors is shared through communication lines, thus enabling redundant evaluation of the information received. Said communication lines are buffered so that in spite of shared information, the actual output of a particular microprocessor never jeopardizes the electrical autonomy of another microprocessor. Isolation of the inputs and outputs of each microprocessor is also insured. This is achieved by means of individual optocouplers 99 for each line. Said optocouplers 99 use a beam of light within said CAN circuit to transmit a signal without a physical connection. Said optocouplers 99 isolate said microprocessors from any damage which may occur as a result of the failure of an outlying component or assembly.

In the event of any serious system fault at any time during the operation of the system, an ignition interrupt trigger 17 provides said central processing unit 16 with a means for stopping said vehicle 1. Said interrupt trigger 17 interfaces with said ignition circuit 27 of said vehicle 1 through a relay drive pack 78. Said interrupt trigger 17 enables said central processing unit 16 to shut off the vehicle engine only, while maintaining necessary accessory functions, allowing the driver to move said vehicle 1 to the side of the road.

Figure 7:
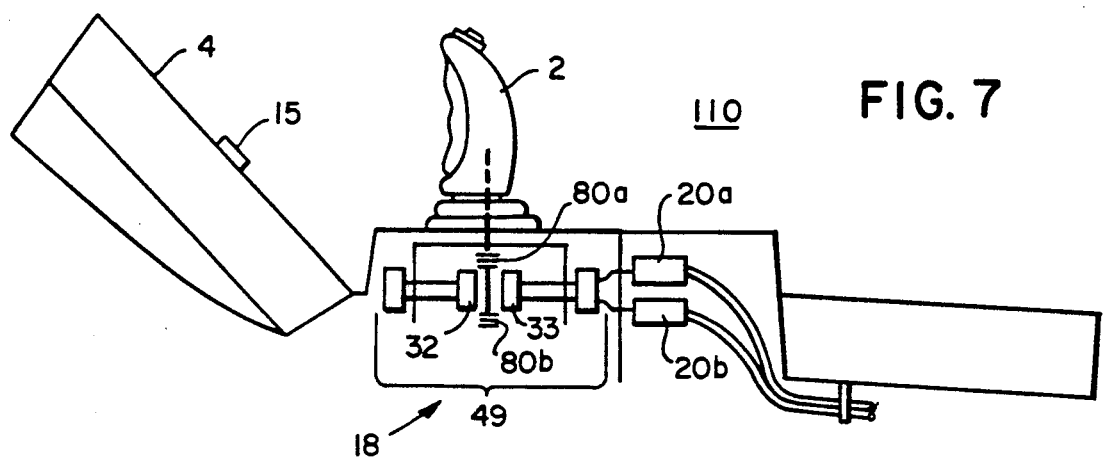
FIG. 7 is a detailed side view of the joystick assembly.

To incorporate the digital action/reaction process of the physically-impaired vehicle driver, said joystick 2 of the present invention is constructed using a set of potentiometers to provide the desired mechanical/electronic interface, as illustrated in FIG. 7. In particular, said joystick 2 operates as a two-axis assembly wherein a front-to-back axis utilizes a high reliability potentiometer 49 to control acceleration and braking functions, and a left-to-right axis controls steering utilizing a system of opposing potentiometers 32 and 33. Said joystick 2 is manufactured of high quality steel stampings and machined aluminum components. Said joystick 2 employs two axial compression springs 80a and 80b, to allow said joystick 2 to center itself when there is an absence of input force.

Figure 8:
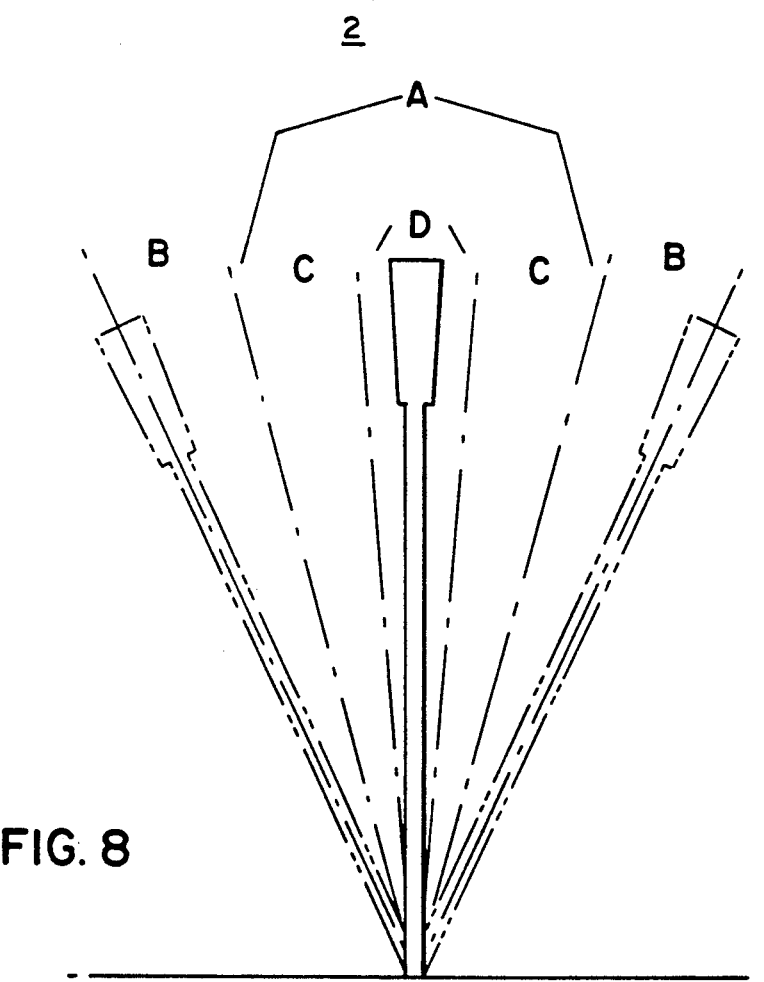
FIG. 8 is a descriptive view of the control bands of the joystick of the present invention.

The particular feature of said joystick 2 which distinguishes it from the prior art involves the steering operation. Referring to FIG. 8 regarding this feature, when said vehicle 1 is driven straight ahead, said joystick 2 has a large area near the straight-up position that may be referred to as the center deadband (region A). This deadband is approximately plus or minus 15 degrees about the steering axis of said joystick 2. Any motion within the deadband is ignored by said central processing unit 16, allowing the physically-impaired driver the comfort to hold said vehicle 1 in the straight-ahead position in spite of involuntary movement of said joystick 2. When the driver wishes to turn said vehicle 1, said joystick 2 must be moved *beyond* the 15-degree area into a steering region (region B). As long as said joystick 2 is held beyond the 15-degree deflection, the wheels of said vehicle 1 will continue to turn (i.e., the steering angle will increase). To prevent the front wheels from turning further and to hold them at the steering angle they have reached, said joystick 2 may be brought back into a holding region (region C). Region C lies between a 5-degree position and 15-degree deflection. This holding band permits the driver to limit the extent of wheel-turn and at the same time permits a relaxation band wherein involuntary movement will not affect the extent of wheel-turn. To increase the wheel-turn, said joystick 2 is simply moved beyond the limit of region A. When the input wheel-turn extends beyond the desired position or there is a desire to straighten out the wheels completely, then said joystick 2 may be relaxed to its natural straight-up position and when it is within 5 degrees or less of the straight-up position the wheels will return to a centered position at a variable rate, as defined by a centering motion region (region D). Once at the center position, the original center deadband region (region A) will become active.

Additionally, said regions A-C may be further defined to vary the rate at which the wheels turn. This variation is achievable through modifications in the controlling functions of said central processing unit 16. For example, in the preferred embodiment, when said vehicle is moving at 20 miles per hour and said joystick 2 is moved just beyond the 15 degree range, just into region B, said central processing unit 16 will command said steering wheel to turn at 0.25 revolutions per second (i.e., lock-to-lock in about 16 seconds). If said joystick 2 is pushed to full extension in region B, while said vehicle 1 remains at the same speed, said steering wheel will be commanded to rotate at 1.0 revolution per second. As the vehicle speed increases, the extent of rotation is reduced, e.g., at 45 miles per hour the rate of steering wheel revolutions is reduced to 0.12 revs per second at the start of region B and increases to 0.50 revolutions per second at full extension. This rate variation has been incorporated into the present invention as a result of the human factors observations previously described. The rate variation permits the physically-impaired driver to drive in the same manner as the able-bodied driver by permitting small increments of wheel turn at high speeds.

Within region D there exists means to vary the rate at which said vehicle 1 may be taken out of a turn. For example, if said vehicle 1 has been turned to the right, said joystick 2 may be permitted to return to the straight up position and the wheels of said vehicle 1 will self-center. However, if the driver wishes to increase the rate at which the wheels return from the right-hand turn, said joystick may be moved to the left of center, within region D, and the wheels will return to the straight ahead position more quickly than if self-centering were permitted. The rate at which this return occurs is less than if said joystick 2 were positioned in region B but more so than when said joystick is in the straight-up position.

Figure 9:
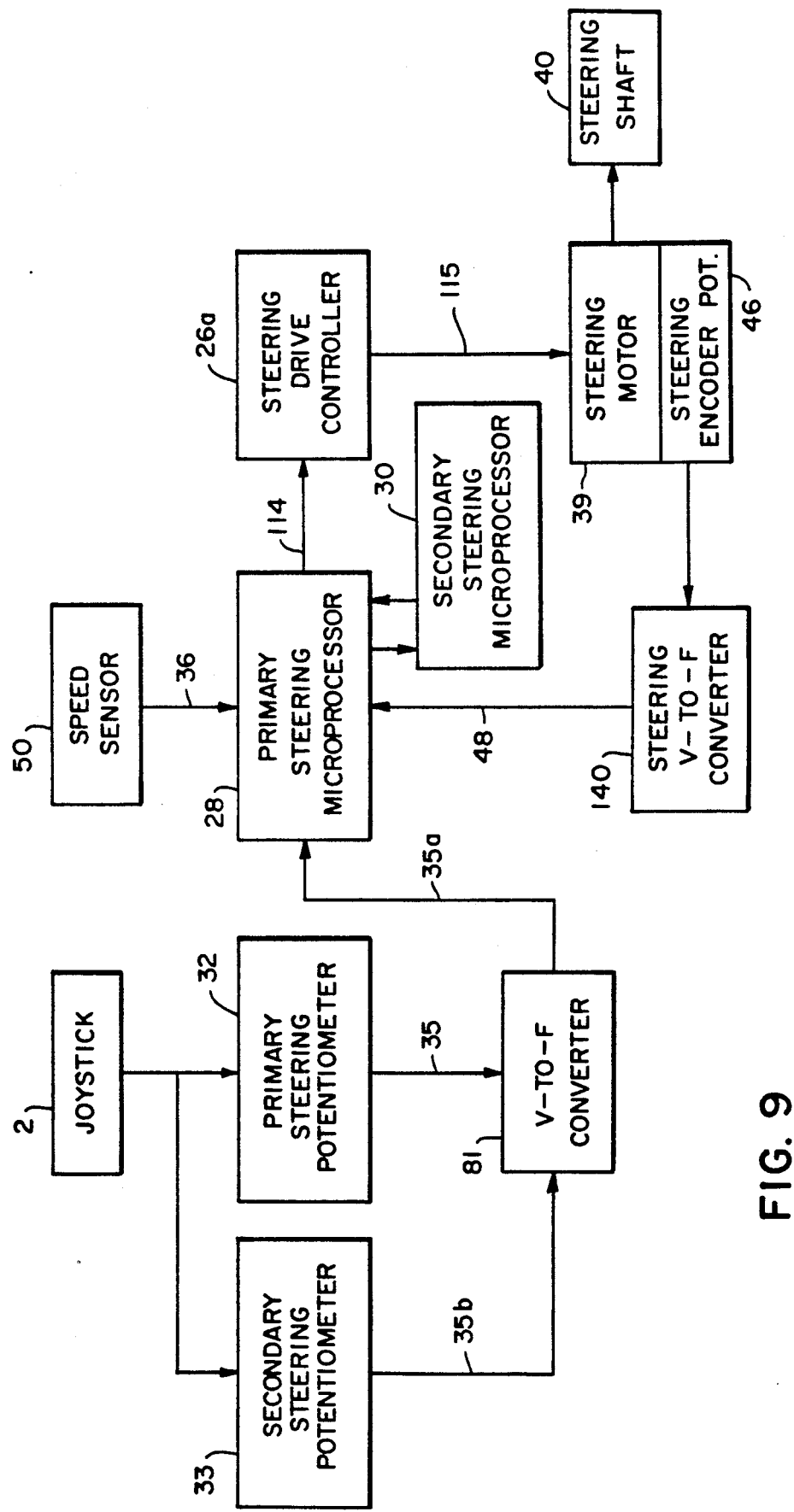
FIG. 9 is a schematic block diagram of the steering function of the present invention.

FIG. 9 illustrates a schematic block diagram of a control system of the present invention for the steering function of said vehicle 1. To initiate a turn, said joystick 2 is moved left or right, in the manner previously described, through region A into region B. This mechanical movement is translated into a first electronic steering signal 35 by means of primary steering potentiometer 32 and a secondary steering signal 35b by means of a secondary steering potentiometer 33, wherein said secondary potentiometer 33 is a redundant backup for said primary potentiometer 32. Said potentiometers 32 and 33 are of any type which translate mechanical motion into a voltage signal. A key feature of the present invention is a voltage-to-frequency converter 81, located under said orthotic pad 11, converts said first steering signal 35 into a steering frequency signal 35a. Said converter 81 is designed with three discrete sections and four discrete circuits, so that the failure of one section will not disable the present control system. In particular, the first section converts said first electronic steering signal 35 from said primary steering potentiometer 32 and a second section converts the signal from said secondary steering potentiometer 33. The third section operates to convert the joystick signal related to the acceleration and braking functions of said vehicle 1. Said converter 81 permits operation of the stepper motors of the present invention, wherein said steering motor 39 translates left and right joystick movement into small and discrete shifts in steering wheel rotation. Said converter 81 permits the digital actions of the driver to be translated into digital data which in turn is processed by said central processing unit 16.

To control steering, a primary steering microprocessor 28 compares said steering frequency signal 35a with a present-position signal 36 transmitted by said speed sensor 50. The variance between the desired extend of wheel turn, as indicated by said steering frequency signal 35a, and the present extent of wheel turn, as indicated by a steering encoder signal 48, is analyzed by said primary steering microprocessor 28. Said primary steering microprocessor 28 in turn transmits a second electronic steering signal 114 to said steering drive controller 26a which in turn transmits a steering movement signal 115 through a steering motor cable 38 to said steering motor 39 located within said steering assembly 6 of the present invention.

Figures 10, 10A:
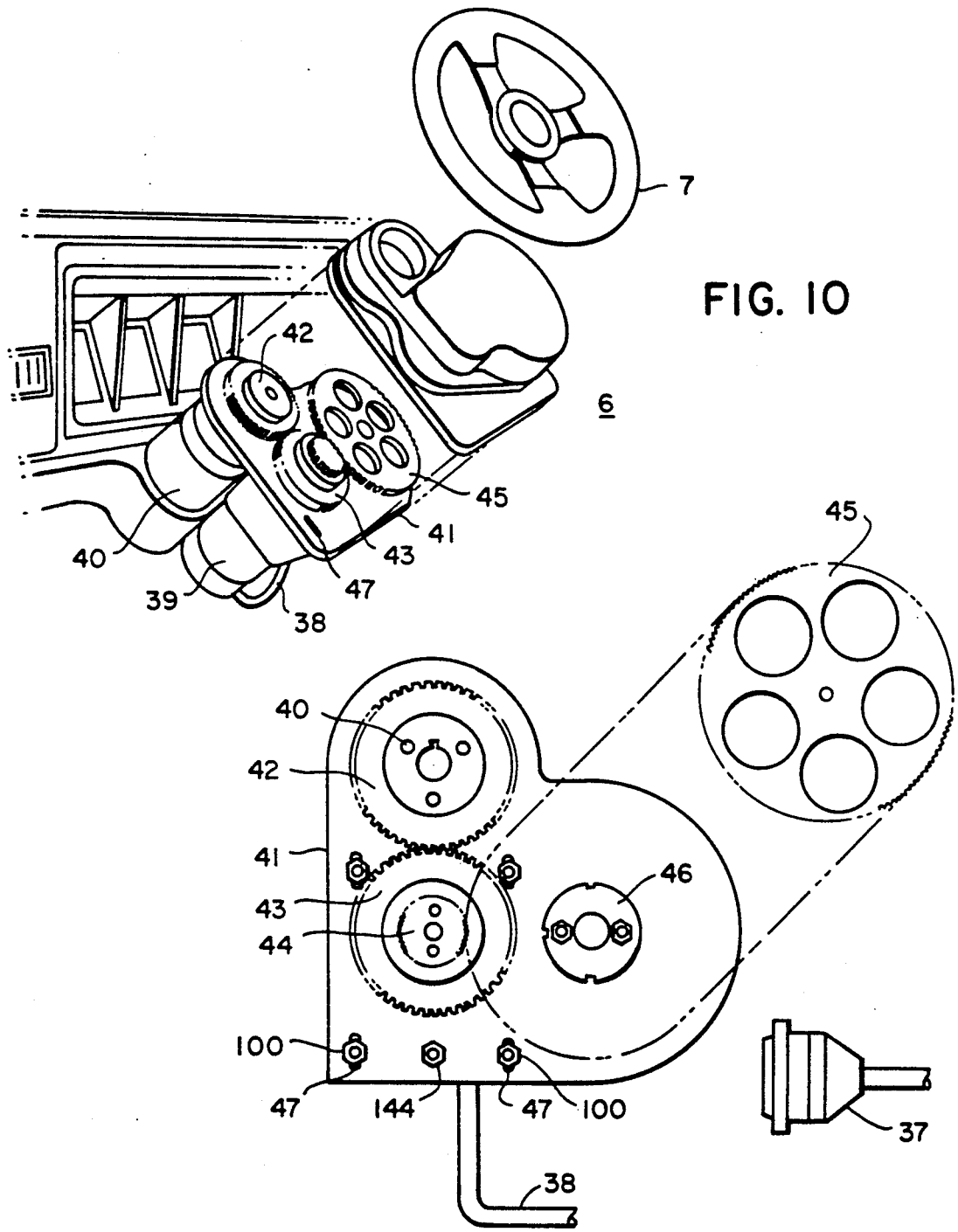
FIG. 10 is a perspective view of the steering assembly of the present invention.
FIG. 10a is a top view of the steering assembly.

As illustrated in FIGS. 10 and 10a, said steering motor 39 operates to transmit the steering input by the movement of said joystick 2 to a standard, manufacturer-supplied steering shaft 40 of said vehicle 1. Initially, said steering shaft 40 is shortened to compensate for the added length resulting from the attachment of said steering assembly 6. This shortening of said shaft 40 is achievable by cutting and fitting said shaft 40 without removing such safety features as collapsibility and airbags. In particular, a steering plate 41 is affixed to said steering shaft 40 by attaching a 4" diameter column gear 42 to said steering shaft 40. Said steering plate 41 further comprises a steering motor gear 43, a steering motor/encoder interface gear 44, a steering encoder gear 45 and a steering encoder potentiometer 46. The movement of said steering motor gear 43 is controlled by said steering motor 39 to which it is affixed. Said motor gear 43 in turn moves said steering shaft 40 by directly contacting said column gear 42. Adjustable slots 47 on said steering plate 41 permit the adjustment of said motor gear 43 to fit the teeth of said column gear 42. Both said motor gear 43 and said column gear 42 have face widths of 0.75" and 48 teeth to yield a ratio of 1:1. Said motor/encoder interface gear 44, with a 1.5" diameter and 48 teeth, transmits the rotary motion of said motor gear 43 to said steering encoder gear 45. Said steering encoder gear 45, with a 6.25" diameter and 199 teeth, sets a ratio of 4.15:1, thus enabling said steering encoder gear 45 to turn less than one full revolution for the entire 3.8 revolutions required by said steering wheel 7 to go from a full left to a full right turn. The movement of said encoder gear 45 is in turn transformed into said steering encoder signal 48 by means of said steering encoder potentiometer 46. Said steering encoder signal 48 is changed from a voltage to a frequency by means of a voltage-to-frequency steering converter 140 and is then transmitted to said primary steering microprocessor 28 through a steering encoder cable 37, for comparison with said first electronic steering signal 35 to determine the extent to which said steering frequency signal 35a should be modified, as well as to confirm that said steering motor 39 has been commanded to operate as indicated by the movement of said joystick 2. Said steering converter 140 is located within said steering assembly 6.

Figure 11:
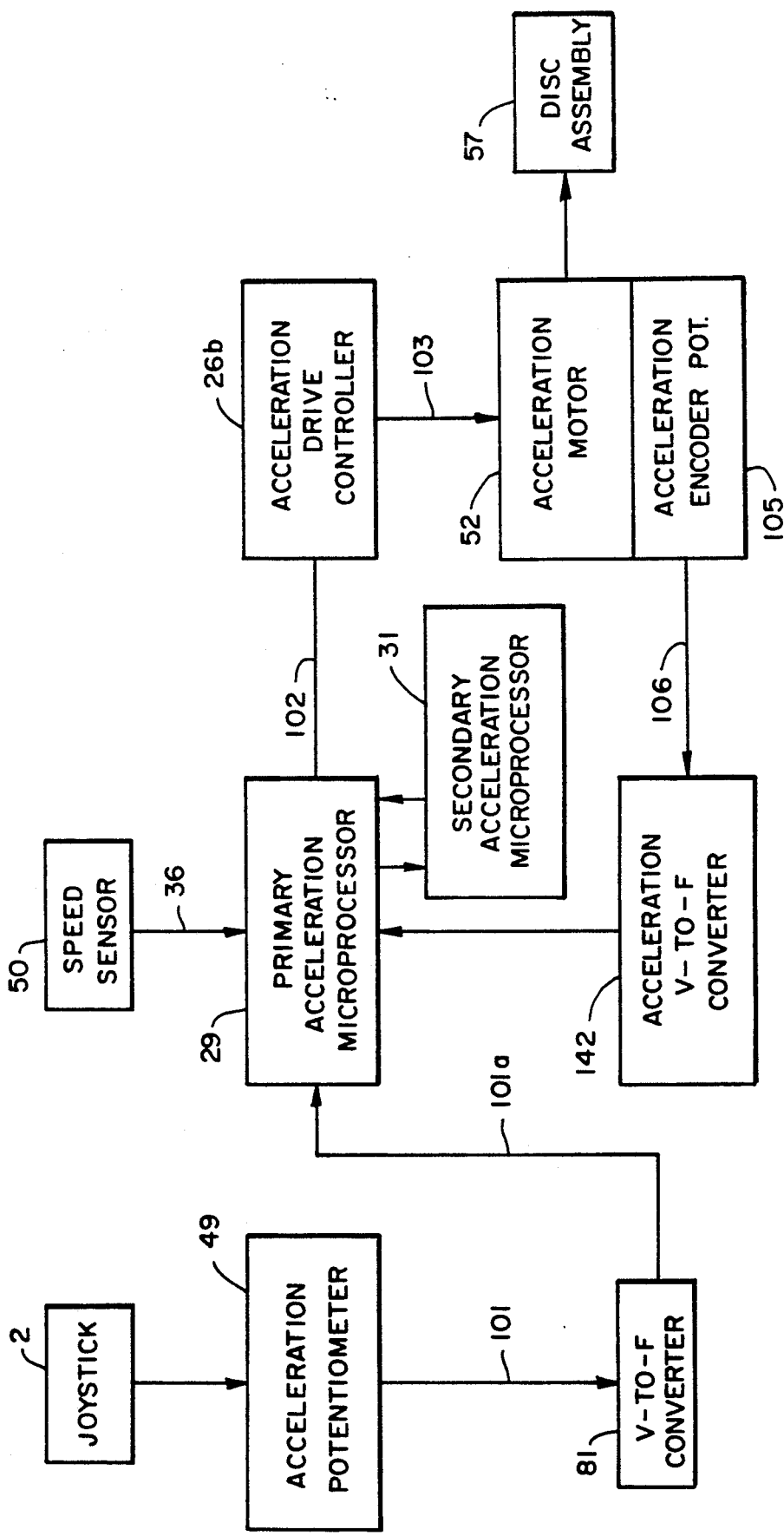
FIG. 11 is a schematic block diagram of the acceleration/braking function of the present invention.
Figure 12:
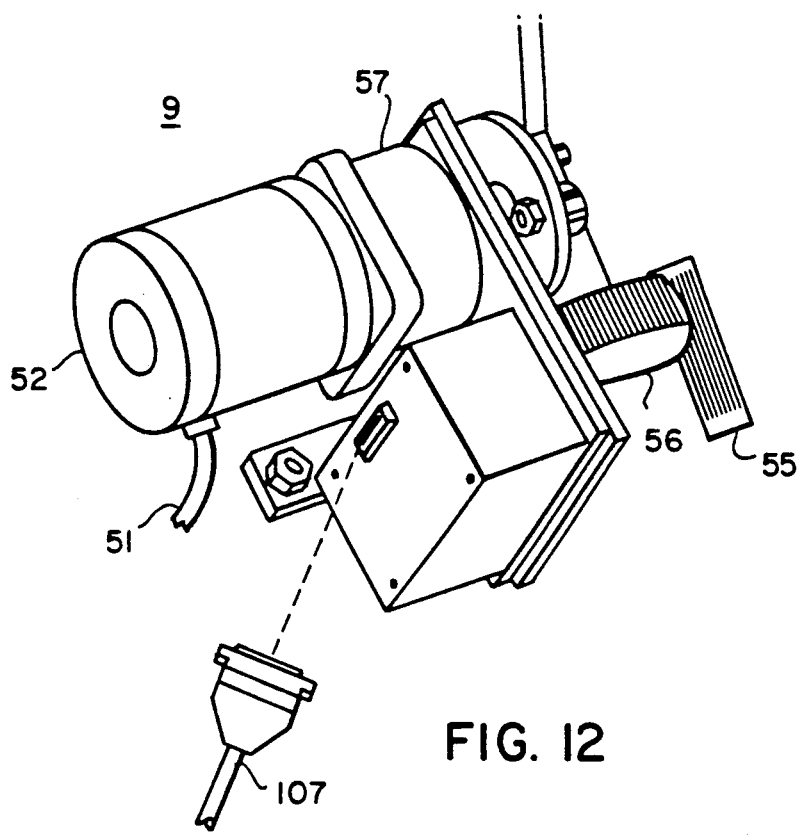
FIG. 12 is a perspective view of the acceleration/braking assembly of the present invention.
Figure 12A:
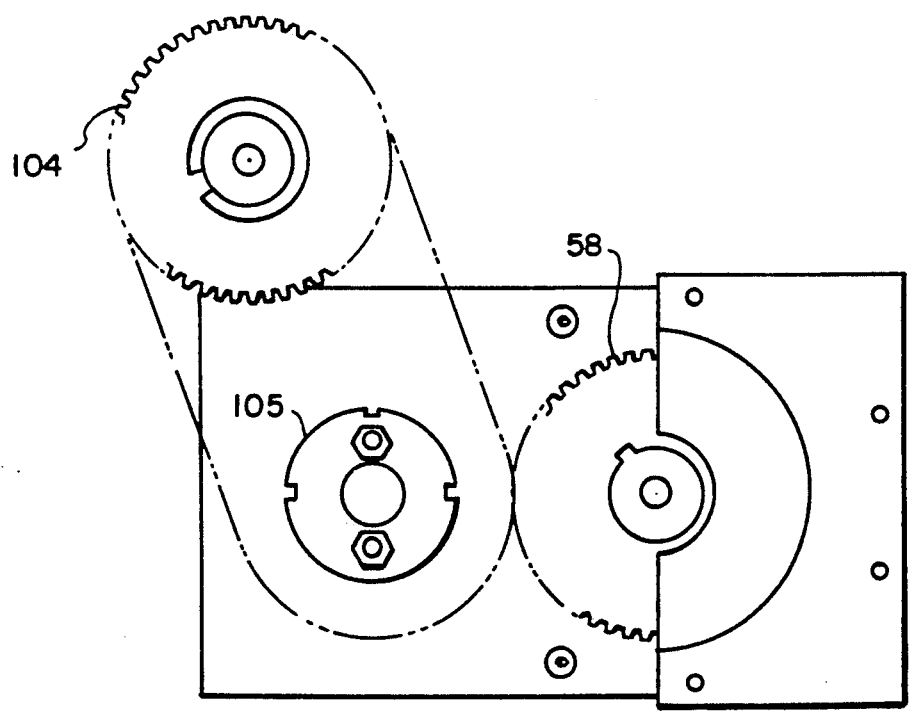
FIG. 12a is a top view of the gears of the acceleration/braking assembly.
Figures 13, 13A:
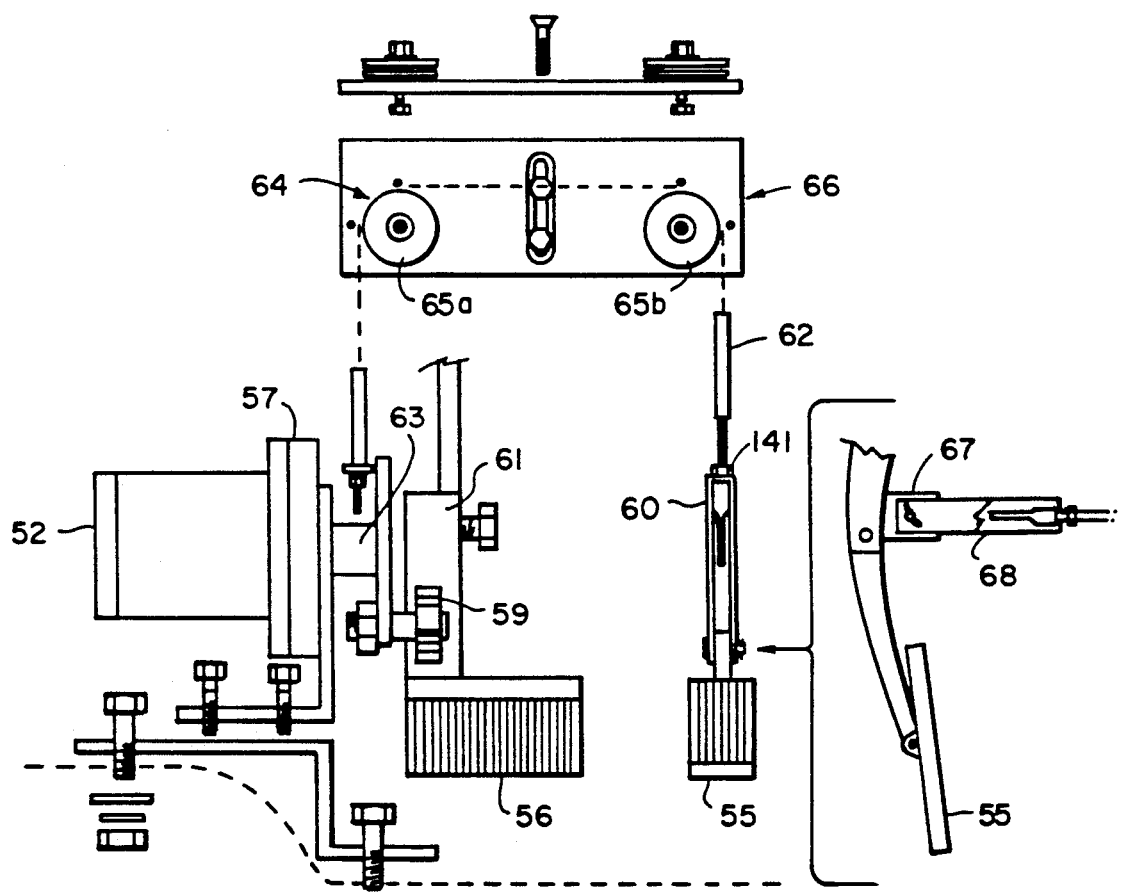
FIG. 13 is a front view of the acceleration/braking assembly of the present invention.
FIG. 13a is a side view of the adapted accelerator pedal of the present invention.

FIG. 11 illustrates a schematic block diagram of a control system of the present invention for the acceleration and braking functions of said vehicle 1. To accelerate said vehicle 1, said joystick 2 is moved forward, i.e., toward said display unit 4. To decelerate said vehicle 1, said joystick 2 is moved backward, i.e., toward said orthotic pad 11. This mechanical movement is translated into a first electronic acceleration signal 101 by means of a primary acceleration potentiometer 49. Said voltage-to-frequency converter 81 in turn converts said signal 101 into an acceleration frequency signal 101a. A primary acceleration microprocessor 29 compares the output from said acceleration frequency signal 101a with the output from said vehicle speed sensor 50. Said primary acceleration microprocessor 29 transmits a second electronic acceleration signal 102 to said acceleration drive controller 26b located within said power supply/drive unit 5. Said acceleration drive controller 26b in turn transmits an acceleration signal 103 through an acceleration cable 51 to an acceleration motor 52 located within said acceleration/braking assembly 9 of the present invention.

As illustrated in FIGS. 12, 12a, 13 and 13a, said acceleration motor 52 operates an acceleration pedal 55 and a brake pedal 56 which remain in their common location within the driver's space of said vehicle 1. In particular, said acceleration motor 52 is attached to said pedals 55 and 56 by means of a disc assembly 57, which is attached to an acceleration gearhead 58 of said acceleration motor 52. In the preferred embodiment, said disc assembly 57 is fitted with a cam follower roller 59 and an acceleration eyelet 60. Said cam follower roller 59 contacts the surface of a brake pedal arm 61 so as to actuate said brake pedal 56. Said acceleration eyelet 60 retains an acceleration cable 62, which actuates said acceleration pedal 55.

To control said brake pedal 56, said disc assembly 57 sets the movement of said cam follower roller 59 along an arc which is 2.125" from the center point of an acceleration motor output shaft 63 of said acceleration gearhead 58 in order to generate a thrust of 194.2 pounds. As said disc assembly 57 rotates to force said cam follower roller 59 to press said brake pedal arm 61, the moment arm decreases to a minimum of 1.01" and the applied force increases to a maximum of 407.76 pounds. The speed of actuation is estimated to be about 7.0" per second, which results in full braking in less than 0.3 seconds.

Actuation of said accelerator pedal 55 is achieved by means of a cable and pulley assembly 64 which is affixed to said disc assembly 57. Said acceleration eyelet 60 is set up such that it will pull said acceleration cable 62 on a rotation opposite to the braking rotation. A capture nut 141 affixed to said acceleration eyelet 60 permits said acceleration cable 62 to slide within said acceleration eyelet 60 to allow for rotation of said disc assembly 57 upon deceleration of said vehicle 1. Said capture nut 141 permits said acceleration eyelet 60 to pull said acceleration cable 62 upon acceleration of said vehicle 1. Two pulleys 65a and 65b are set on an adjustable plate 66 which in turn is mounted to said steering shaft 40. This arrangement permits said acceleration cable 62 to be affixed to said acceleration pedal 55 at an acceleration cable mounting point 67. In particular, said acceleration cable 62 is affixed to an adjustable clevis 68 which in turn may be welded to said mounting point 67. Through this arrangement, the force needed to operate said accelerator pedal 55 is minimal in comparison to the force required to actuate said brake pedal 56. The speed of actuation of said accelerator pedal 55 is about 5.0" per second, yielding a full acceleration time of 0.5 seconds.

An acceleration encoder gear 104 interfaces with said acceleration gearhead 58 and, in turn, moves an acceleration encoder potentiometer 105. Said acceleration potentiometer 105 then transmits an acceleration encoder signal 106 through a voltage-to-frequency acceleration converter 142, which in turn transmits said acceleration encoder signal 106 to said primary acceleration microprocessor 29 through an acceleration encoder cable 107. Said acceleration encoder signal 106 is then compared with the signal received from said speed sensor 50 and said primary acceleration potentiometer 49. Said acceleration converter 142 is located within said acceleration/braking assembly 9.

In order to operate the control system of the present invention, said steering motor 39 and said acceleration motor 52 that operate the steering, acceleration and braking of said vehicle 1, are, preferably, stepper motors. In particular, said motors 39 and 52, which are moved by alternately energizing the many windings of said motors so as to make the increment of movement 1.8 degrees of motion in said motors, provide 4000 discrete and repeatable locations in one revolution. Through the gearheads of said motors, both of which have 20-to-1 ratios, the mechanical operation of the steering, acceleration and braking means through said joystick 2 is achieved with absolute positioning controllable by a repeated output. The utilization of stepper motors further permits power draw for the system to come entirely from excess power available from said main battery 82 of said vehicle 1.

A key feature of the present invention is the ease with which control of said vehicle 1 by a displaced individual can be switched over to control by an able-bodied individual. As previously stated, said able-body switch 79, when activated, will disable said vacuum sensor 69 so that said central processing unit 16 will never initiate the operation of the system described. In particular, said able-body switch 79 overrides the initialization sequence previously described by preventing said microprocessors 28-31 from receiving a signal that the engine of said vehicle 1 is creating a vacuum. Although failure to detect a vacuum would prevent activation of said ignition circuit 27, said able-body switch 79 activates said ignition circuit 27 such that said vehicle 1 is operable without the control system described herein.

To enable the able-bodied driver to control said steering wheel 7, a safety bolt 144 is removed and adjustment bolts 100 located within said adjustable slots 47 are loosened. Said steering motor gear 43 can then be slid down and thereby disengaged from said column gear 42 which is affixed to said steering shaft 40. As a result of the location of said adjustable clevis 68 and said cam follower roller 59, said acceleration pedal 55 and said brake pedal 56 are operable by an able-bodied driver at all times and therefore require no adjustments.

Figure 14:
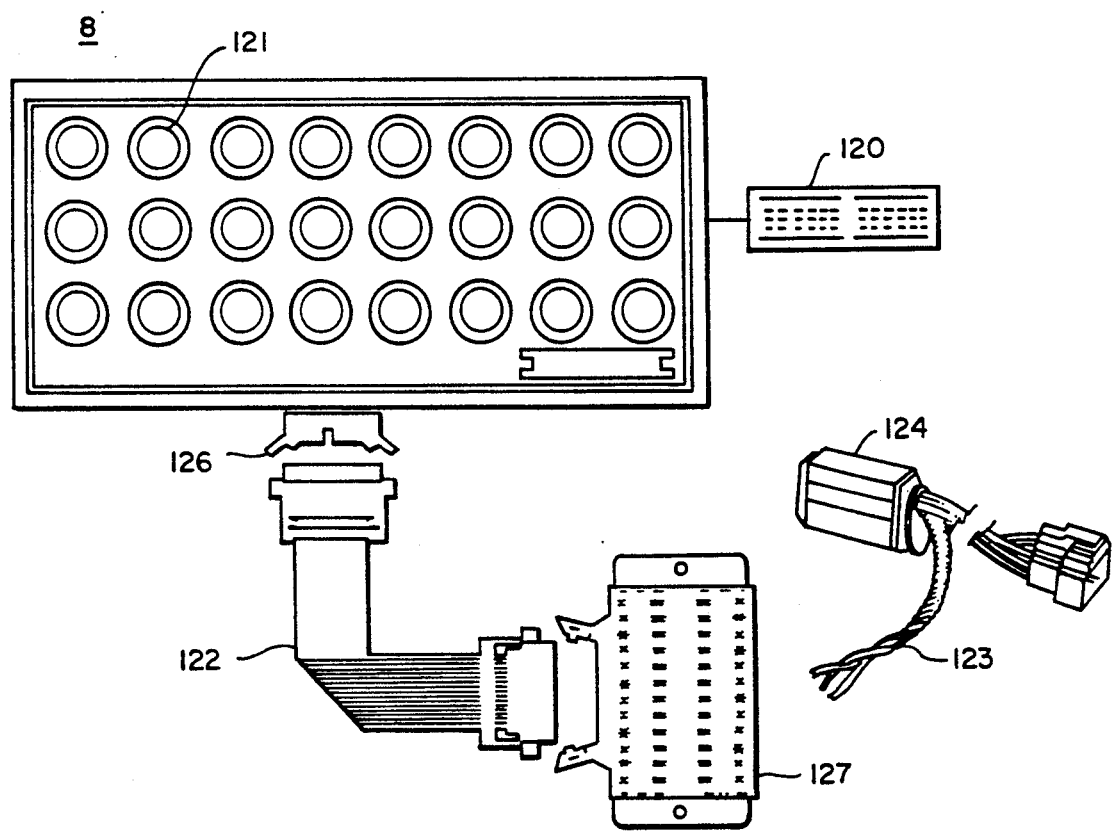
FIG. 14 is a diagram of the control touch pad system of the present invention, including a front view of the touch pad.

To complete the entire system of the present invention, such that a physically-impaired individual may operate said vehicle 1 with total self-sufficiency, said control touch pad 8 is positioned within the passenger compartment of said vehicle 1. Said control touch pad 8, as illustrated in FIG. 14, comprises a plurality of membrane switches 121 of said touch pad 8, when pressed, transmit touch pad signals, related to the particular function selected, through a 26-pin membrane connector 126 and a ribbon cable 122 to an interface unit 127. Said interface unit 127 in turn transmits command signals by means of trigger wires 123 through a relay-driver module 124 to various operational units within said vehicle. Said touch pad 8 may be utilized to operate: (1) a transmission of said vehicle 1, (2) an ignition system of said vehicle 1, and (3) lights, windows, windshield wipers and other accessories of said vehicle 1.

A key to the utilization of the device incorporating said touch pad 8 is said relay-driver module 124. Specifically, said relay-driver module 124 permits easy disconnect of said trigger wires 123 such that internal wiring for the devices controlled by said touch pad 8 will not be disturbed in the event that changes in membrane switch 121 controls are to be made. Further, a programmable switching device 120 permits reprogramming of the operation of said touch pad 8.

Although the preferred embodiment of the present invention has been described herein, it is to be remembered that the above description is merely illustrative. Other methods may be employed to provide a physically-impaired individual with control of a vehicle wherein the control system takes into account the human factors described herein. Accordingly, it is to be understood that the present invention is not limited to that precisely shown and described.

I claim:

1. A control system for a vehicle of the type having: (i) a rotary steering shaft; (ii) an accelerator pedal; and (iii) a brake pedal, wherein said control system comprises:

a. a remote manipulator, wherein said manipulator has two axes of movement, wherein one axis of movement directs the rotation of said steering shaft and a second axis of movement directs the displacement of said accelerator pedal and said brake pedal;

b. first electronic means connected to said remote manipulator, wherein said first electronic means translates mechanical movement of said remote manipulator into a first electronic steering signal and a first electronic acceleration signal;

c. command means connected to said first electronic means, wherein said command means receives and processes said first electronic steering signal and said first electronic acceleration signal and wherein said command means transmits a second electronic steering signal related to the rotation of said steering shaft and a second electronic acceleration signal related to the displacement of said accelerator pedal and said brake pedal;

d. a steering drive controller and an acceleration drive controller, wherein both of said controllers are connected to said command means, wherein said steering drive controller receives said second electronic steering signal and said acceleration drive controller receives said second electronic acceleration signal, wherein said steering drive controller transmits a steering movement signal and said acceleration drive controller transmits an acceleration signal;

e. a steering motor connected to said steering drive controller, wherein said steering motor receives said steering movement signal and translates said steering movement signal into mechanical motion, wherein said steering motor is connected to said rotary steering shaft and wherein said steering motor rotates said steering shaft as directed by said steering controller;

f. an acceleration motor connected to said acceleration drive controller, wherein said acceleration motor receives said acceleration signal and translates said acceleration signal into mechanical motion; and g. a disc assembly connected to said acceleration motor, wherein said disc assembly operates to displace said accelerator pedal and said brake pedal.

2. The control system as claimed in claim 1 further comprising a display system, wherein said display system comprises a plurality of indicator lights, wherein said indicator lights display the status of an initialization sequence conducted by said command means.

3. The control system as claimed in claim 1 further comprising means to disengage said command means and means to disengage said steering motor, wherein said means to disengage said command means comprises a vacuum sensor deactivation switch and said means to disengage said steering motor comprises adjustable slots to slidably remove said steering motor from said steering shaft.

4. The control system as claimed in claim 1 further comprising a power cable to transmit power from a main battery and an alternator of said vehicle to said control system.

5. The control system as claimed in claim 4 further comprising backup power supply means, wherein said backup power supply means transmits power to said control system when said main battery and said alternator fail.

6. The control system as claimed in claim 5 further comprising a power supply unit, wherein said power supply unit connects to said main battery and said backup power supply means and wherein said power supply unit transmits power to said control system.

7. The control system as claimed in claim 6 wherein said power supply unit further comprises converter means to convert 12 volt output from said main battery and said alternator to 84 volt output to said steering drive controller and said acceleration drive controller.

8. The control system as claimed in claim 1 further comprising vehicle sensors connected to said command means, wherein said vehicle sensors are attached to said vehicle, wherein said vehicle sensors detect engine vacuum, vehicle motion and vehicle startup, and wherein said sensors transmit vehicle status signals to said command means through a vehicle interface cable.

9. The control system as claimed in claim 1 further comprising a steering encoder attachable to said steering motor, wherein said steering encoder translates mechanical motion of said steering motor into a steering encoder signal and transmits said steering encoder signal to said command means.

10. The control system as claimed in claim 1 further comprising an acceleration encoder attachable to said acceleration motor, wherein said acceleration encoder translates mechanical motion of said acceleration motor into an acceleration encoder signal and transmits said acceleration encoder signal to said command means.

11. The control system as claimed in claim 1 wherein said steering motor and said acceleration motor are stepper motors.

12. The control system as claimed in claim 1 wherein said disc assembly comprises:
    a. a cam follower roller, wherein one end of said cam follower roller is affixed to a gearhead of said acceleration motor and the other end of said cam follower roller is affixed to a brake pedal arm of said brake pedal and wherein said cam follower roller actuates said brake pedal; and
    b. a cable pulley assembly comprising:
      i. an acceleration eyelet, wherein said acceleration eyelet is affixed to said gearhead of said steering motor;
      ii. an acceleration cable, wherein said acceleration cable is attached to said acceleration eyelet such that said acceleration cable slides through said acceleration eyelet to decelerate said vehicle and said acceleration eyelet pulls said acceleration cable to accelerate said vehicle; and
      iii. an adjustable clevis, wherein one end of said clevis is attached to said acceleration cable and an opposite end of said clevis is attached to said accelerator pedal such that said adjustable clevis actuates said accelerator pedal.

13. The control system as claimed in claim 1 wherein said command means comprises:
    a. a programmable primary steering microprocessor, wherein said primary steering microprocessor receives said first electronic steering signal from said first electronic means and wherein said primary steering microprocessor transmits said second electronic steering signal to said steering drive controller; and
    b. a programmable primary acceleration microprocessor, wherein said primary acceleration microprocessor receives said first electronic acceleration signal and wherein said primary steering microprocessor transmits said second electronic acceleration signal to said acceleration drive controller,
wherein said primary steering microprocessor and said primary acceleration microprocessor further comprise integrated circuits to coordinate the operation of both said primary steering microprocessor and said primary acceleration microprocessor.

14. The control system as claimed in claim 13 wherein said integrated circuits within said primary steering microprocessor and aid primary acceleration microprocessor are CAN integrated circuits.

15. The control system as claimed in claim 14 further comprising secondary command means and secondary electronic means.

16. The control system as claimed in claim 15 wherein said secondary command means comprises:
    a. a programmable secondary steering microprocessor, wherein said secondary steering microprocessor receives a secondary steering signal from said secondary electronic means; and
    b. a programmable secondary acceleration microprocessor, wherein said secondary acceleration microprocessor receives a secondary acceleration signal from said secondary electronic means,
wherein said secondary microprocessors operate continuously and parallel with said primary microprocessors, wherein said secondary microprocessors further comprise coordinating integrated circuitry, wherein said secondary microprocessors provide backup signal processing in the event of primary microprocessor failure and wherein performance of said primary microprocessors is comparable against said secondary microprocessors.

17. The control system as claimed in claim 1 wherein said remote manipulator is a joystick.

18. The control system as claimed in claim 17 wherein said joystick comprises three regions of displacement related to the rotation of said steering shaft, said regions comprising:
    a. a center deadband region to hold said vehicle in a straight-ahead position;
    b. a steering region to command rotation of said steering shaft, wherein said steering region extends beyond said center deadband region; and
    c. a holding region between said center deadband region and said steering region, wherein said holding region maintains the steering angle of said steering shaft at the angle commanded by movement of said joystick into said steering region.

19. The control system as claimed in claim 18 whereins said joystick further comprises two axial compression springs, wherein said springs operate to center said joystick when there is no force applied to said joystick.

20. The control system as claimed in claim 18 wherein said deadband region is plus or minus 15 degree about a steering axis of said joystick, wherein said steering region is between 15 and 50 degrees displacement in either sense about said steering axis and wherein said holding region is between 5 and 15 degree displacement in either sense about said steering axis of said joystick.

21. The control system as claimed in claim 1 wherein said electronic means comprises a steering potentiometer to translate left-and-right motion of said remote manipulator into said first electronic steering signal and an acceleration potentiometer to translate forward and backward motion of said remote manipulator into said first acceleration signal.

22. The control system as claimed in claim 1 further comprising a touch control device to provide multifunction control of said vehicle, wherein said touch control device comprises:
    a. a plurality of membrane switches, wherein said member switches correspond to a plurality of control functions of said vehicle;
    b. a ribbon cable to transmit touch pad signals from said membrane switches;
    c. a programmable control unit, wherein said control unit receives said touch pad signals from said membrane switches and transmits control unit signals to a relay-driver module, wherein said relay-driver module comprises a plurality of quick-disconnect switches; and
    d. trigger wires attached to said relay-driver module, wherein said trigger wires receive control unit signals from said relay-driver module and wherein said trigger wires transmit said control unit signals to a plurality of accessories of sid vehicle.

23. A control system for specialized operation of a vehicle by a physically-impaired individual, wherein said vehicle is of the type having: (i) a rotary steering shaft; (ii) an accelerator pedal; and (iii) a brake pedal, wherein said control system comprises:

a. a joystick, wherein said joystick has two axes of movement, wherein one axis of movement directs the rotation of said steering shaft and a second axis of movement directs the displacement of said accelerator pedal and said brake pedal and wherein comprises:
   i. a center deadband region to hold said vehicle in a straight-ahead position;
   ii. a steering region to command rotation of said steering shaft, wherein said steering region extends beyond said center deadband region; and
   iii. a holding region between said center deadband region and said steering region, wherein said holding region maintains the steering angle of said steering shaft at the angle commanded by movement of said joystick into said steering region;
b. first electronic means connected to said remote manipulator, wherein said first electronic means translates mechanical movement of said joystick into a first electronic steering signal and a first electronic acceleration signal;
c. command means connected to said first electronic means, wherein said command means comprises:
   i. a programmable primary steering microprocessor, wherein said primary steering microprocessor receives and processes said first electronic steering signal from said first electronic means receives and processes said first electronic steering signal and transmits a second electronic steering signal related to the rotation of said steering shaft; and
   ii. a programmable primary acceleration microprocessor, wherein said primary steering microprocessor receives and processes said first electronic acceleration signal from said first electronic means and transmits a second electronic acceleration signal related to the displacement of said accelerator pedal and said brake pedal;
   wherein said primary steering microprocessor and said primary acceleration microprocessor further comprise integrated circuits to coordinate the operation of both said primary steering microprocessor and said primary acceleration microprocessor;
d. a steering drive controller and an acceleration drive controller, wherein both of said controllers are connected to said command means, wherein said steering drive controller receives said second electronic steering signal and said acceleration drive controller receives said second electronic acceleration signal, wherein said steering drive controller transmits a steering movement signal and said acceleration drive controller transmits an acceleration signal;
e. a steering motor connected to said steering drive controller, wherein said steering motor receives said steering movement signal and translates said steering movement signal into mechanical motion, wherein said steering motor is connected to said rotary steering shaft and wherein said steering motor rotates said steering shaft as directed by said steering controller;
f. an acceleration motor connected to said acceleration drive controller, wherein said acceleration motor receives said acceleration signal and translates said acceleration signal into mechanical motion, and wherein said steering motor and said acceleration motors are stepper motors;
g. a disc assembly connected to said acceleration motor, wherein said disc assembly comprises:
   i. a cam follower roller, wherein one end of said cam follower roller is affixed to a gearhead of said acceleration motor and the other end of said cam follower roller is affixed to a brake pedal arm of said brake pedal and wherein said cam follower roller actuates said brake pedal; and
   ii. a cable pulley assembly comprising:
      (a) an acceleration eyelet, wherein said acceleration eyelet is affixed to said gearhead of said steering motor;
      (b) an acceleration cable, wherein said acceleration cable is attached to said acceleration eyelet such that said acceleration cable slides through said acceleration eyelet to decelerate said vehicle and said acceleration eyelet pulls said acceleration cable to accelerate said vehicle; and
      (c) an adjustable clevis, wherein one end of said clevis is attached to said acceleration cable and an opposite end of said clevis is attached to said accelerator pedal such that said adjustable clevis actuates said accelerator pedal; and
h. a control touch pad to provide multi-function control of said vehicle, wherein said control touch pad comprises:
   i. a plurality of membrane switches, wherein said member switches correspond to a plurality of control functions of said vehicle;
   ii. a ribbon cable to transmit touch pad signals from said membrane switches;
   iii. a programmable control unit, wherein said control unit receives said touch pad signals from said membrane switches and transmits control unit signals to a relay-driver module, wherein said relay-driver module comprises a plurality of quick-disconnect switches; and
   iv. trigger wires attached to said relay-driver module, wherein said trigger wires receive control unit signals from said relay-driver module and wherein said trigger wires transmit said control unit signals to a plurality of accessories of said vehicle.

* * * * *